(12) United States Patent
Anzelde et al.

(10) Patent No.: US 7,475,358 B2
(45) Date of Patent: Jan. 6, 2009

(54) ALTERNATE PROGRESS INDICATOR DISPLAYS

(75) Inventors: Thomas R. Anzelde, San Jose, CA (US); Zhao Lu, Campbell, CA (US); Oscar Llarena, Apopka, FL (US); Mark E. Molander, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 11/353,585

(22) Filed: Feb. 14, 2006

(65) Prior Publication Data

US 2007/0192723 A1   Aug. 16, 2007

(51) Int. Cl.
*G06F 3/048* (2006.01)
(52) U.S. Cl. .................. 715/772; 715/748; 715/769; 715/770; 715/771; 715/774; 715/859
(58) Field of Classification Search .................. 715/772
See application file for complete search history.

(56) References Cited

U.S. PATENT DOCUMENTS

| | | | |
|---|---|---|---|
| 6,275,987 B1* | 8/2001 | Fraley et al. ................. | 717/127 |
| 6,301,580 B1* | 10/2001 | Eigel-Danielson .......... | 707/102 |
| 6,874,130 B1* | 3/2005 | Baweja et al. ............... | 715/805 |
| 7,343,566 B1* | 3/2008 | Chaudhri et al. ............ | 715/781 |
| 2001/0055017 A1* | 12/2001 | Ording ....................... | 345/440 |
| 2004/0046790 A1* | 3/2004 | Agarwal et al. ............. | 345/748 |

* cited by examiner

*Primary Examiner*—Dennis-Doon Chow
*Assistant Examiner*—Yongjia Pan
(74) *Attorney, Agent, or Firm*—Canady & Lortz LLP; Bradley K. Lortz

(57) ABSTRACT

Embodiments of the present invention are directed to novel techniques for showing the progress of an automated computer process, particularly through a graphical user interface (GUI). Graphical status displays are employed which show graphical time-based information, such as rate and estimated time to completion, as well as a completion portion of an automated computer process. A remaining time indicator can be shown as a time scale for the graphical completion indicator. Instantaneous and historical rate information may be graphically displayed in various novel displays.

2 Claims, 8 Drawing Sheets

ALTERNATE PROGRESS INDICATOR DISPLAYS

BACKGROUND OF THE INVENTION

1. Field of the Invention

This invention relates to computer implemented systems and methods for indicating the progress of a computer process. Particularly, the invention relates to systems and methods indicating the progress of a computer process through a graphical user interface (GUI).

2. Description of the Related Art

Progress bars are a well known visual indicator used in almost every type of software, and particularly those which employ a graphical user interface (GUI). For example, progress bars are commonly used to indicate the progress of a software installation or the progress of a copy or file transfer process.

FIG. 1 illustrates a typical progress bar 100 employed in the GUI 102 of a display 104 for a typical computer operating system. The progress bar 100 may be shown in a window of a running software application 106 which is performing an automated process such as downloading a file, installing a software application or performing a database query. As the automated process progresses, the length of the bar 100 increases such that the position of the leading edge 108 of the bar 100 between the start position 110 and the end position 112 indicates the current portion of the process completed.

The scale of the conventional progress bar (the length from the start position 110 to the end position 112) corresponds linearly to some measure of the process being performed. For example, if the automated computer process is downloading a file, the scale typically corresponds to the size of the file being downloaded. Thus, the progress bar tracks the portion of the file that has been downloaded so far. Similarly, in a software installation, the scale may correspond to the total size or number of files which are being copied to the system or even the total number of operations that must be performed to complete the installation. In many cases, the scale of conventional progress bars are often not shown, eliminating meaningful information and leaving the user completely ignorant of what they actually represent. In addition, multiple automated processes may sometimes be performed in series, each showing a separate progress bar. In this case, the progress bar is even less meaningful to the user who has no idea how many progress bar animations must be viewed from start to finish before the overall process is actually completed. In a worst case, a conventional progress bar only serves to inform the user that some "progress" is being made.

Supplemental data is sometimes provided with conventional progress bars as well. For example, values 114 for the completed portion and total size may also be shown, and be regularly updated. In addition, an updated estimate of the remaining time 116 as well as an estimate of the overall transfer rate 118 may also be shown. Importantly, these values are typically calculated from overall progress and represent a running average of the process performance; they do not present instantaneous information corresponding to process performance at a particular moment in time. The application 106 simply tracks the total amount of time that has expired since starting and applies this to the completed portion of the process to determine the average rate. This average rate is then assumed for the remaining portion (the completed portion subtracted from the total size) and used to determine the estimated time left for the automated process.

Employing a running average rather than an instantaneous rate means the displayed rate 116 can often be particularly deceptive to the user. For example, an automated process may become stalled such that the instantaneous rate is zero. However, because the rate shown is a running average, this may not be immediately apparent to the user. The displayed rate will simply begin to decline as the transpired time increase with no change in the completed portion. Accordingly, it is often necessary for the user to monitor a conventional progress bar display for a period of time to make a full determination of how the process is proceeding.

A conventional progress bar also provides no graphical presentation related to the rate of completion (either instantaneous or a running average) or time remaining. Although some computer processes, such as a file download, may display a rate and sometimes an estimated completion time as updated values, these values are separate from the graphical display of the progress bar which only tracks the state of the process completion. There is no graphical display which includes such time-based information, such as rate or remaining time.

Thus, there are no widespread solutions in use today that address these issues. Some processes may display a rate of completion, e.g., a file transfer process may display a current transfer rate as a number in Mbps. However, the transfer rate value is not graphical and provides only instantaneous information as it is constantly changing. In addition, such conventional displays do not provide any instantaneous rate information, including historical rate information. Similarly, a remaining time estimate is displayed only as a changing number and presents the same limitations.

In view of the foregoing, there is a need for systems and methods that provide meaningful information to users regarding the progress of an automated computer process. There is also a need in the art for such systems and methods to provide prospective as well as historical information regarding the progress of the automated computer process. There is a need for this information to be displayed in a graphical display that may be readily interpreted by a user. Further, there is a need for such systems and methods to provide a graphical time-based information regarding the automated computer process, such as process rate or remaining time information. There is still further a need for such systems and methods to provide instantaneous process rate information, including historical process rate information. As detailed hereafter, these and other needs are met by the present invention.

SUMMARY OF THE INVENTION

Embodiments of the present invention are directed to novel techniques for showing the progress of an automated computer process, particularly through a graphical user interface (GUI). Graphical status displays are employed which show graphical time-based information, such as rate and estimated time to completion, as well as a completion portion of an automated computer process. A remaining time indicator can be shown as a time scale for the graphical completion indicator. Instantaneous and historical rate information may be graphically displayed in various novel displays.

A typical embodiment of the invention comprises a computer program embodied on a computer readable medium, including program instructions for displaying a graphical completion indicator showing a completed portion of the automated process and program instructions for displaying a graphical time-based indicator showing time-based information of the automated process. Typically, the graphical completion indicator may comprise a bar having a varying length to show the completed portion of the automated process. The graphical time-based indicator may be a graphical rate indicator and/or a graphical remaining time indicator.

A graphical rate indicator can provide instantaneous rate information displayed with, or as part of, a completion bar. For example, the graphical rate indicator can include at least a portion of the bar showing a color indicating a current completion rate. The graphical rate indicator may also comprise a graph showing historical instantaneous rate information within the graphical completion indicator. In this case, the graph of the graphical rate indicator may comprise a varying height of the bar to show the historical rate information of the automated process. Alternately, the graph of the graphical rate indicator may comprise a varying line within a constant width of the bar to show the historical rate information of the automated process.

A graphical remaining time indicator can also provide an estimate of the time remaining for the automated process. The graphical remaining time indicator can comprise a time scale of the graphical completion indicator. In another example, the completed portion of the automated process can be shown by a first portion of a first rectangle partially intersecting a second rectangle to show and the graphical remaining time indicator comprises a second portion of the first rectangle extending outside the second rectangle to show a remaining time estimate.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Various embodiments of the present invention allow a user to quickly determine rate of completion and time remaining while performing a long-running task. In addition a user may also employ historical rate of completion data for making decisions regarding when and how to commit the automated computed processes in the future. Embodiments of the invention, also operate while conserving GUI real estate, which can be particularly limited in a dialog box. Also, a user can easily see an estimated rate of completion as it is constantly changing.

To meet these goals, various embodiments of the present invention are directed to graphical status displays which show graphical time-based information, such as rate and estimated time to completion, as well as a completion portion of an automated computer process. A remaining time indicator can be shown as a time scale for the graphical completion indicator. Instantaneous and historical rate information may be graphically displayed in various novel displays.

Some embodiments of the invention show the instantaneous historical rates of progress that existed starting from the start of the process. Such historical instantaneous rate information is useful. For example, this information can be applied to determine which server to download a file from at different times in the day. A graphical time remaining display can also assists the user in determining that information more quickly than a numerical display. In general, graphical indicators as described herein are desirable alternatives to numeric or textual indicators.

2. Hardware Environment

Figure 1:
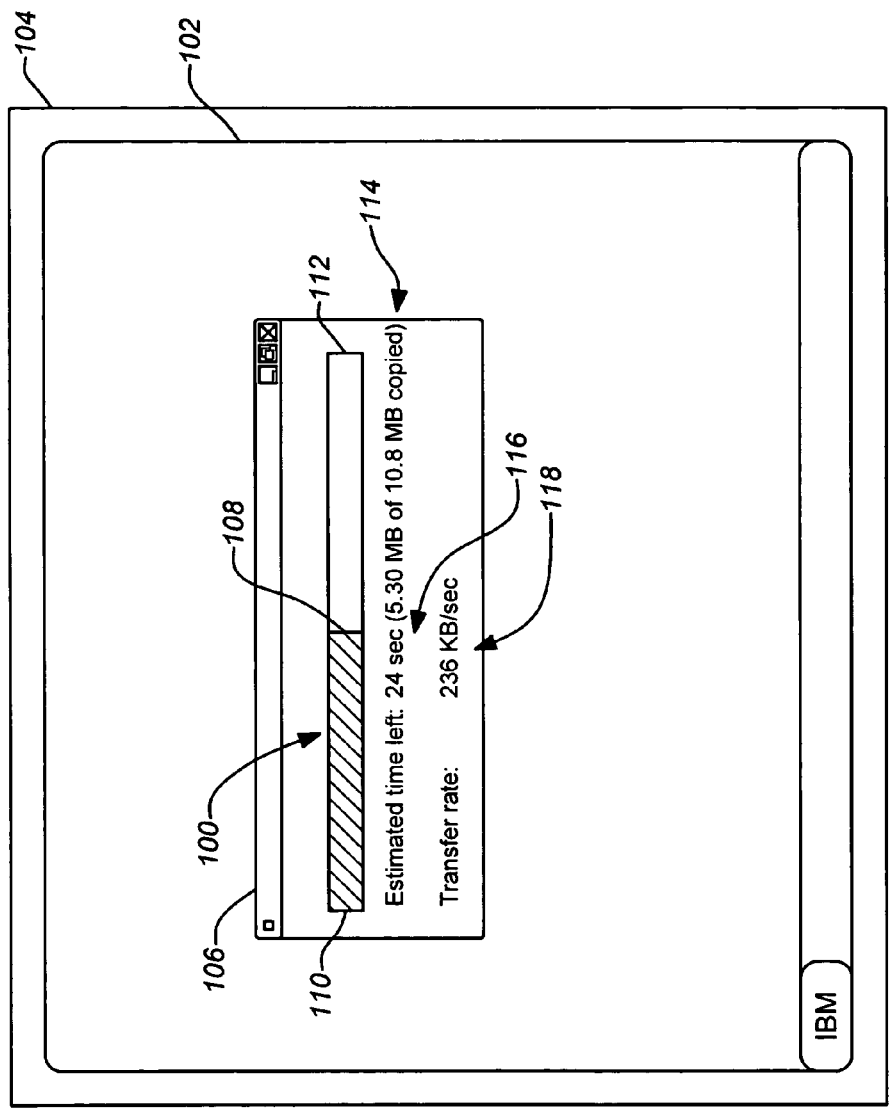
FIG. 1 shows a prior art progress bar display of an automated computer process.
Figure 2:
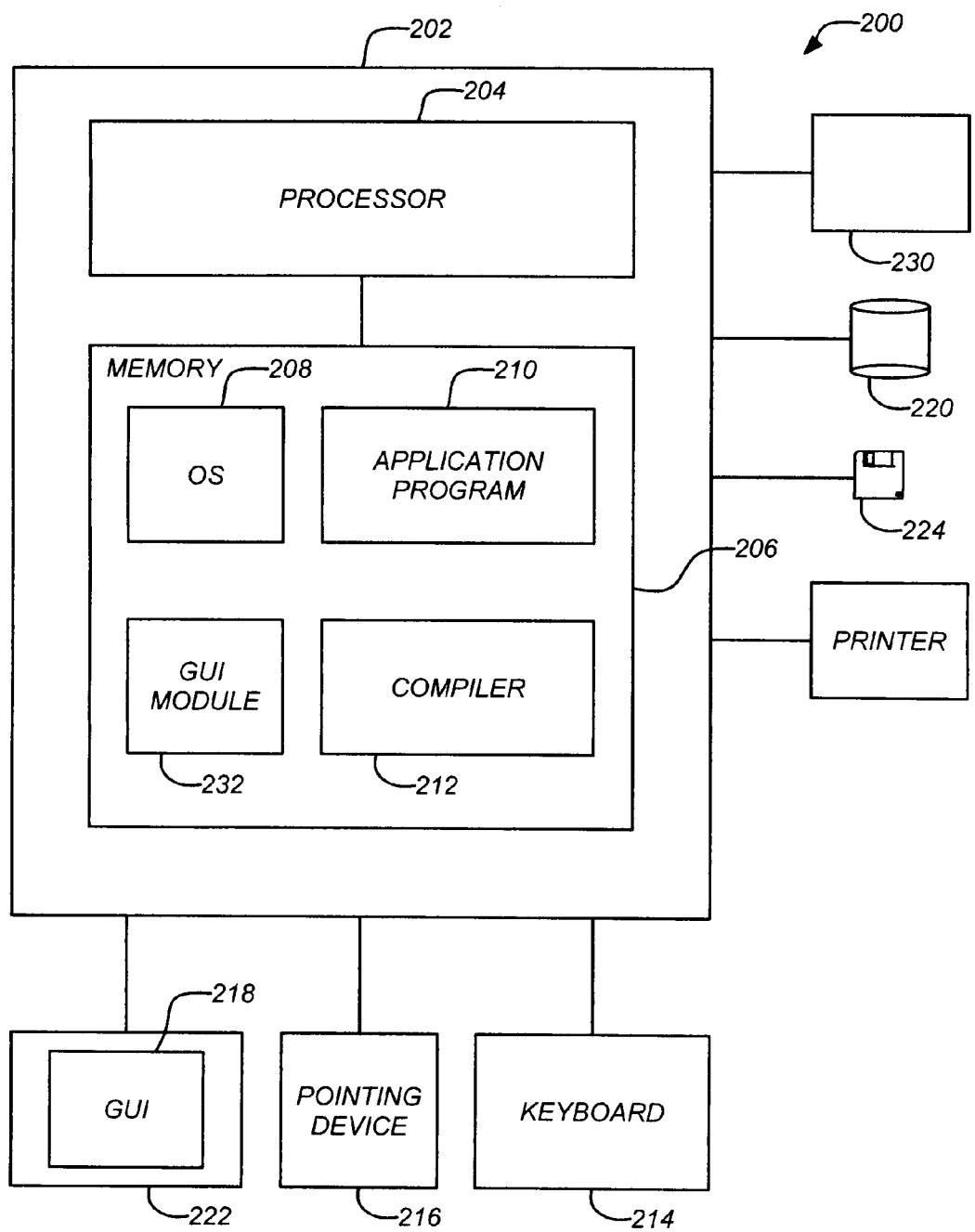
FIG. 2 illustrates an exemplary computer system that can be used to implement embodiments of the present invention.

FIG. 2 illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, the computer program 210, or implemented with special purpose memory and processors. The computer 202 also implements a compiler 212 which allows an application program 210 written in a programming language such as COBOL, PL/1, C, C++, JAVA, ADA, BASIC, VISUAL BASIC or any other programming language to be translated into code readable by the processor 204. After completion, the computer program 210 accesses and manipulates data stored in the memory 206 of the computer 202 using the relationships and logic that was generated using the compiler 212. The computer 202 also optionally comprises an external data communication device 230 such as a modem, satellite link, ethernet card, wireless link or other device for communicating with other computers, e.g. via the Internet or other network.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc 224, hard drive, DVD/CD-rom, digital tape, etc. Further, the operating system 108 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention are generally directed to any software application program 210 which performs some type of automated process for a period of time. For example, embodiments of the invention may be applied to file download applications, database query applications and software installation applications, but the invention is not limited to these applications. Program embodiments of the invention may comprise a subprogram or applet of a much larger software application invoked as needed, such as a download applet that is only activated when the user requests a remote file. The application program 210 includes program instructions to communicate progress information pertaining to the automated process to the user through the GUI module 232.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Progress Indicator Displays

A rate of completion display, particularly a graphical rate indicator, can provide easily interpreted information which would allow a user to take action. For example, if a database can comfortably handle two automated processes comprising simultaneous queries from two threads but not three, then graphical rate of completion information in a progress indicator can a low the user to see the magnitude of the performance cost of the additional automated process. Also, the performance effect can also be shown for each thread (if each thread has an individual progress indicator).

Also, a numeric display, which may be highly unstable, can be more difficult to read than a graphical indicator. For example, in a constant period of time, if the completion rate of an automated process varies too much, a user may not be able to comfortably read and interpret the numbers. Some of this difficulty may be relieved by the developers at compile time by lowering the sampling rate for the rate measurement. But, if the progress bar is intended to display the progress of software or hardware whose speed could be upgraded significantly, the problem will eventually arise with upgrades to hardware and software. A graphical solution can avoid this problem.

Further enhancements afforded by embodiments of the present invention include providing graphical time-based information, including historical rate information, and a compact graphical display. A graphical time remaining display can assist the user in quickly determining the remaining time for a given automated process. In general, graphical indicators are viable alternatives to numeric or textual indicators. Historical information regarding rate of completion can also be useful, e.g. it may assist a user in determining which server to download a file from at different times in the day by comparing the rates for each server at previous times. Finally, depending on the implementation chosen for these features, GUI real estate can be conserved also. Whereas, conventional progress bars allow the user only to determine percent of completion graphically, embodiments of the present invention allow time-based information, such as rate of completion and/or time remaining, to be determined graphically. As detailed below, various types of graphical completion and time-based indicators can be employed in any combination.

Figure 3A:
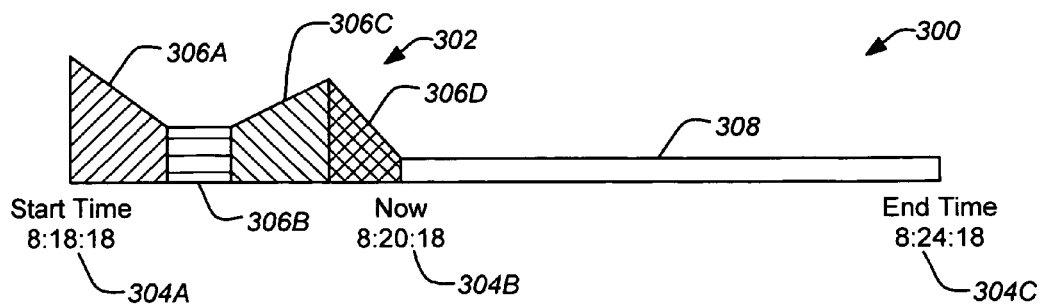
FIG. 3A illustrates a varying height of a graphical completion indicator showing historical rate information of the automated process.

FIG. 3A illustrates a varying height of a graphical completion indicator 300 showing historical rate information of the automated process. The graphical completion indicator 300 shows a completed portion of an automated process indicated by the horizontal length of the bar 302 between the start time 304A and current time 304B. As the automated process progresses, the length of the bar 302 varies to show the completed portion of the automated process. The bar 302 also includes a graphical time-based indicator comprising a graphical rate indicator. The height of the bar 302 indicates the rate of completion relative to a maximum rate. The varying height of the bar 302 may indicate the instantaneous rate at each point in time. Alternately, the varying height of the bar 302 may indicate a running average rate. The changes in rate are thus shown by different regions 306A-306D of the bar 302, e.g. a declining rate region 306A, a constant rate region 306B, an increasing rate region 306C and a steeply declining rate region 306D. In addition, the different regions 306A-306D may be shaded or colored differently to make their different meanings more apparent to a user.

In this case, the graphical completion indicator 300 itself is time based. Thus, a graphical time-based indicator is also incorporated into the graphical completion indicator 300 and comprises a graphical remaining time indicator which is a time scale (as shown by the start, now and end times 302A-302C) of the graphical completion indicator 300. The remaining time indicator includes a remaining time bar 308 between the present time 304B and the end time 304C which graphically shows an estimate of how much more time will be required to complete the automated process. The estimate is based upon the time that has transpired and the rate information from the start time 304A until the present time 304B. The estimate can be based on the instantaneous rate at the present time 304B, a running average rate from the start time 304A until the present time 304B or some other rate, e.g., a combined rate of the present instantaneous and running average rates.

If the actual total length of the bar 302 and the bar 308 is to remain constant as displayed, it is necessary to continuously normalize the total length to the total time, start time 304A to end time 304C, thus changing the scale of the bars 302, 308. In this case, the length of the bar 302 will vary relative to the bar 308. For example, if the process becomes stalled, the length of the bar 302 will continue to shrink as the estimated time to completion continues to grow. Alternately, just the scale the scale of the estimated completion time, bar 308 may be changed. In another alternate, the scales can remain constant and the length of the bar 308 may be allowed to grow. However, the bar 308 may be limited by the available display area.

Figure 3B:
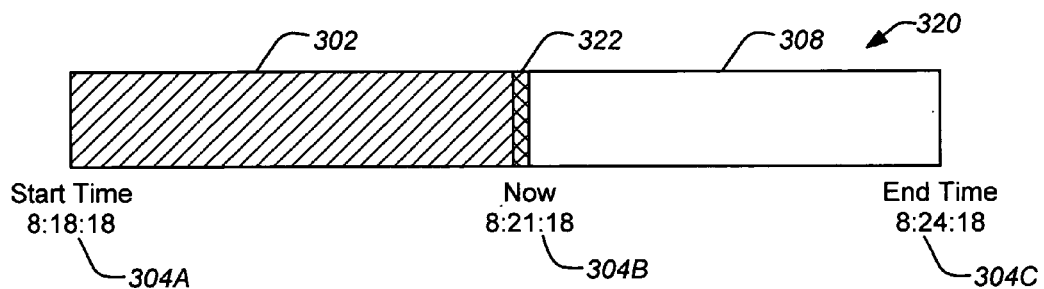
FIG. 3B illustrates a portion of a graphical completion indicator including a color indicating a current completion rate.

FIG. 3B illustrates a portion of a graphical completion indicator 320 including a color indicating a current completion rate. The graphical completion indicator 320 also shows a completed portion of an automated process indicated by the horizontal length of the bar 302 between the start time 304A and current time 304B. However in this case, less rate information is provided to the user than in the graphical completion indicator 300 of FIG. 3A. The bar 302 includes color of at least a portion 322 of the bar 302, e.g., the leading (rightmost) edge, which represents the rate of completion. For example, red may be used to indicate a reduced rate of completion. It may alternately be used indicate that process is stalled and no progress has been made for a predetermined period. The color may change to indicate the rate, e.g. blue to green to yellow to orange to red. Just as with the graphical completion indicator 300 of FIG. 3A, the indicated rate may be the instantaneous rate, a running average rate or a combined rate. Here also, the remaining time indicator includes a remaining time bar 308 between the present time 304B and the end time 304C which graphically shows an estimate of how much more time will be required to complete the automated process. The same principles and options respecting time scaling the bars 302, 308 described for the graphical completion indicator 300 of FIG. 3A apply to the indicator 320 as well.

Figure 3C:
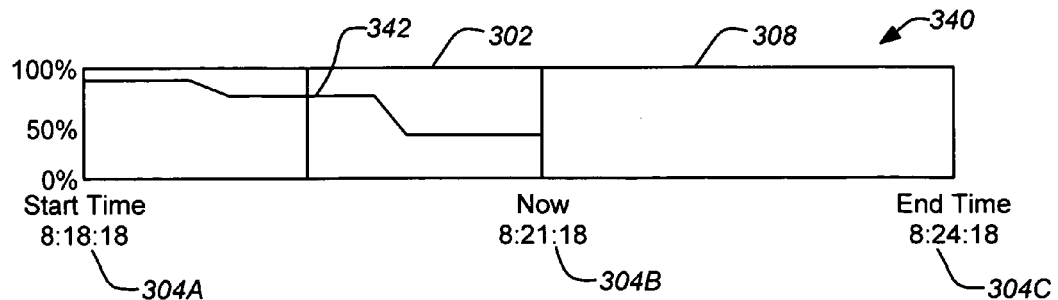
FIG. 3C illustrates a graphical completion indicator including a graph showing historical rate information.

FIG. 3C illustrates a graphical completion indicator 340 including a graph 342 showing historical rate information. The graph 342 within the bar 302 shows the rate of completion at each point in time. The graph is shown having a vertical scale along one edge of the bar indicating a percentage rate. Again, the indicated rate may be the instantaneous rate, a running average rate or a combined rate as with the graphical completion indicator 300 of FIG. 3A. The remaining time indicator includes a remaining time bar 308 between the present time 304B and the end time 304C which graphically shows an estimate of how much more time will be required to complete the automated process. The same principles and options respecting time scaling the bars 302, 308 described for the graphical completion indicator 300 of FIG. 3A apply to the indicator 320 as well.

Figure 3D:
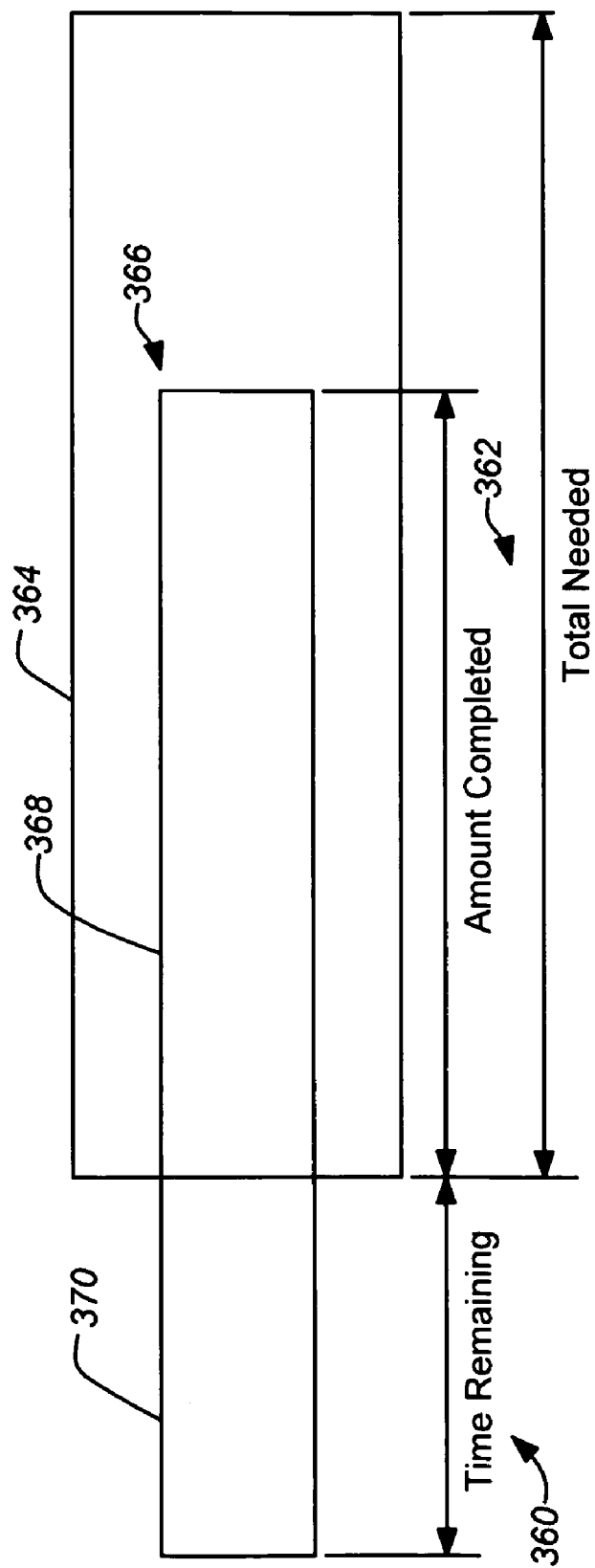
FIG. 3D illustrates a graphical remaining time indicator with a graphical completion indicator.

FIG. 3D illustrates a graphical remaining time indicator 360 with a graphical completion indicator 362. These indicators 360, 362 can be used to emphasize how an automated process converts time into completed work. The combined indicators 360, 362 include a first rectangle 366 and a second rectangle 364. The first rectangle 366 is divided into two portions 368, 370, with a first portion 368 inside the second rectangle 364 and a second portion 370 outside of the second rectangle 364. The second rectangle 364, e.g. its length, represents the estimated amount of total time needed for completion of the automated process. The second portion 370 of the first rectangle 366 outside the second rectangle 364 (e.g. the length of the second portion 370) represents the estimated time needed to complete the automated process. As the process is completed, the second portion 370 gradually decreases as the first portion 368 inside increases. Thus, the first and second portions 368, 370 of the first rectangle 366 can be likened, respectively, to the completion bar 302 and the remaining time bar 308 in the previous FIGS. 3A-3C. Accordingly, the same principles and options respecting time scaling the bars 302, 308 described for the graphical completion indicator 300 of FIG. 3A apply to the indicators 360, 362 as well.

Various embodiments of the invention may incorporate one or more of the various features illustrated in FIGS. 3A-3D. For example, the graph 342 of FIG. 3C or different regions 306A-306D of FIG. 3A may be combined with the colored portion 322 of the bar 302 of FIG. 3B. Some specific exemplary embodiments are detailed hereafter.

Figure 4A:
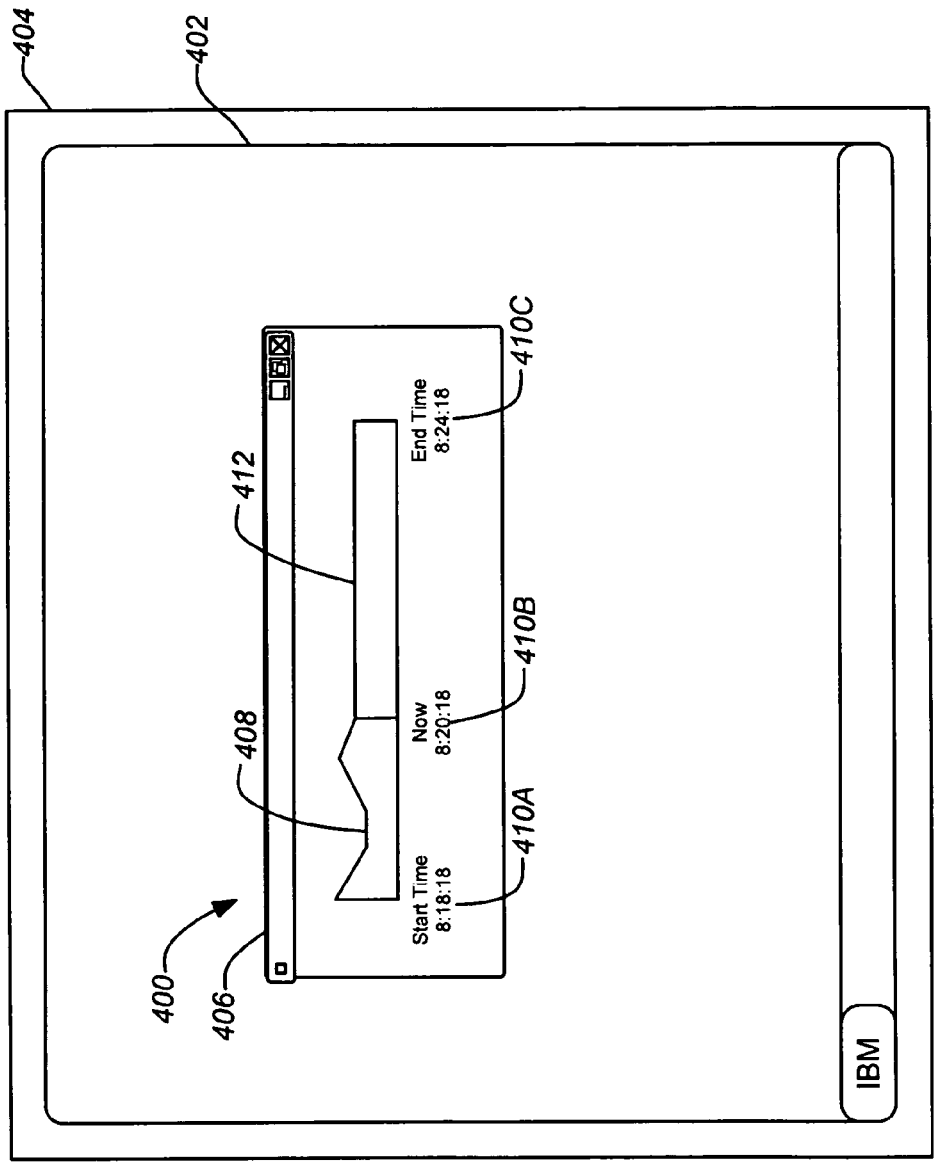
FIG. 4A shows an exemplary progress indicator including a graphical remaining time indicator with a graphical completion indicator.

FIG. 4A illustrates an exemplary progress indicator 400 employed in the GUI 402 of a display 404 for a typical computer operating system. The progress indicator 400 may be shown in a window or dialog box 406 of a running software application which is performing an automated process such as downloading a file, installing a software application or performing a database query. The progress indicator 400 employs a graphical completion indicator shown by the completion bar 408 having a varying height to show historical instantaneous rate information of the automated process as described in FIG. 3A above. The progress indicator 400 also shows a graphical time-based indicator comprising the time scale of the progress indicator 400, shown by the start, present and end times 410A-410C in their relative positions.

Additionally, the time based indicator 400 includes a remaining time bar 412. The length of the remaining time bar 412 is based on a running average rate of the process that has occurred from the start time 410A to the present time 410B. In essence, the running average rate is the area of the completion bar 408 divided by the time. The remaining quantity of processing (e.g. the file portion left to be downloaded) is then divided by the running average rate to yield the estimated remaining time which is shown graphically by the bar 412. The running average rate is also an estimate shown graphically by the height of the remaining time bar 412. In this example, the current running average rate is identical to the current instantaneous rate as evidenced by the heights of both bars 408, 412 being identical at the current time 410B. This is not a necessary outcome, however. A discontinuity may exist where the two bars 408, 412 meet, as will be readily understood by those skilled in the art.

Figure 4B:
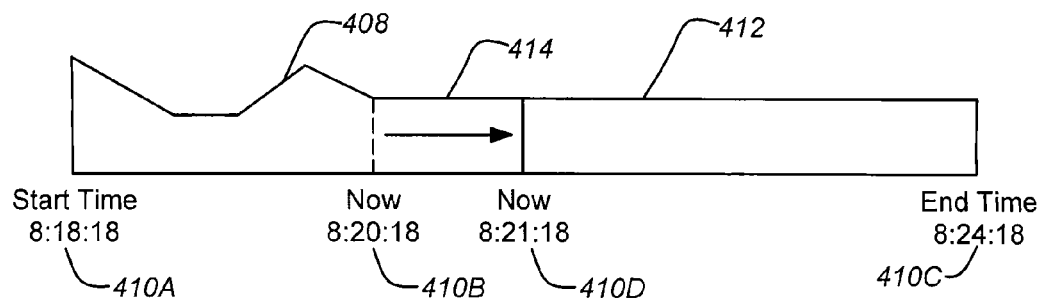
FIGS. 4B-4D show a time scale normalized respectively under a constant, increasing and decreasing rate.
Figure 4C:
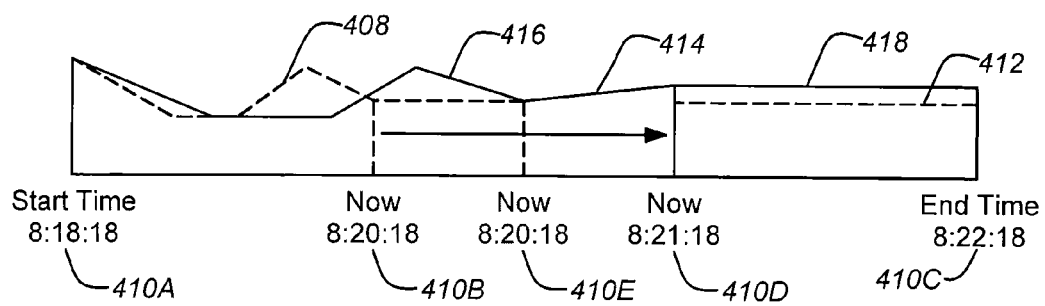
Figure 4D:
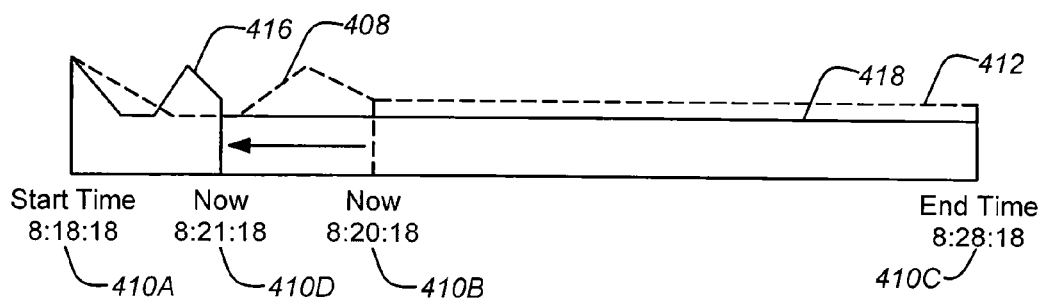

FIGS. 4B-4D show a time scale normalized respectively under a constant, increasing and decreasing rate. In this exemplary progress indicator 400, the time scale is regularly updated to normalize the total length of both the bars 408, 412 with the total estimate time of completion, including the time that has already transpired added to the estimated time of completion. This means the displayed total length of both the bars 408, 412 remains constant on the GUI 402. If the processing rate is remaining constant, the estimated remaining time is essentially accurate and the completion bar 408 grows lengthwise into the region 414 at a constant instantaneous rate (bar height) as the estimated remaining time bar 412 simultaneously shrinks as shown in FIG. 4B. The estimated end time 410C remains unchanged as the old current time 41GB is updated to be the new current time 410D.

However, if the processing rate is increasing, the estimated remaining time must be updated as illustrated in FIG. 4C. The end time 410C is updated to an appropriately lower value. Because the displayed total length of both the bars 408, 412 must remains constant on the GUI 402, the time scale is thus changed. The estimated remaining time bar 412 shrinks in length due to the passage of time combined with the increased running average rate used to estimate the remaining time. The estimated remaining time bar 412 also increases in height to the new remaining time bar 418 due to the increased running average rate. The completion bar 408 grows lengthwise into the region 414 which is also increasing in height. Simultaneous with the expanding region 414, however, the historical completion bar 408 varies in length (although the varying height values remains unchanged) to accommodate the adjusted time scale and becomes the new historical completion bar 416. Thus, even the relative position of the previous current time 41OB moves rightward to relative previous current time 410E as the historical completion bar 408 gradually transforms to the present completion bar 414.

Alternately, if the processing rate is decreasing, the estimated remaining time must be updated as illustrated in FIG. 4D. For example, assuming that the automated process is stalled, the end time 410C continues to increase. However, because the displayed total length of both the bars 408, 412 must remains constant on the GUI 402, the time scale is thus changed. Accordingly, the estimated remaining time bar 412 grows in length due to the passage of time combined with the effectively decreasing running average rate used to estimate the remaining time. The estimated remaining time bar 412 also decreases in height to the new estimated remaining time bar 418 due to the decreasing running average rate. On the other hand, the historical completion bar 408 varies in length (although the varying height values remain unchanged) to accommodate the adjusted time scale and becomes the new historical completion bar 416. Because the process is stalled (and not just slowed), there is no additional profile to be added to the completion bar 416.

It will be apparent to those skilled in the art, that the foregoing exemplary progress indicator 400 can be changed by replacing or supplementing the completion bar 408 having a varying height with any of the previously described graphical rate indicators, e.g. color indicator or a graph.

Figure 5A:
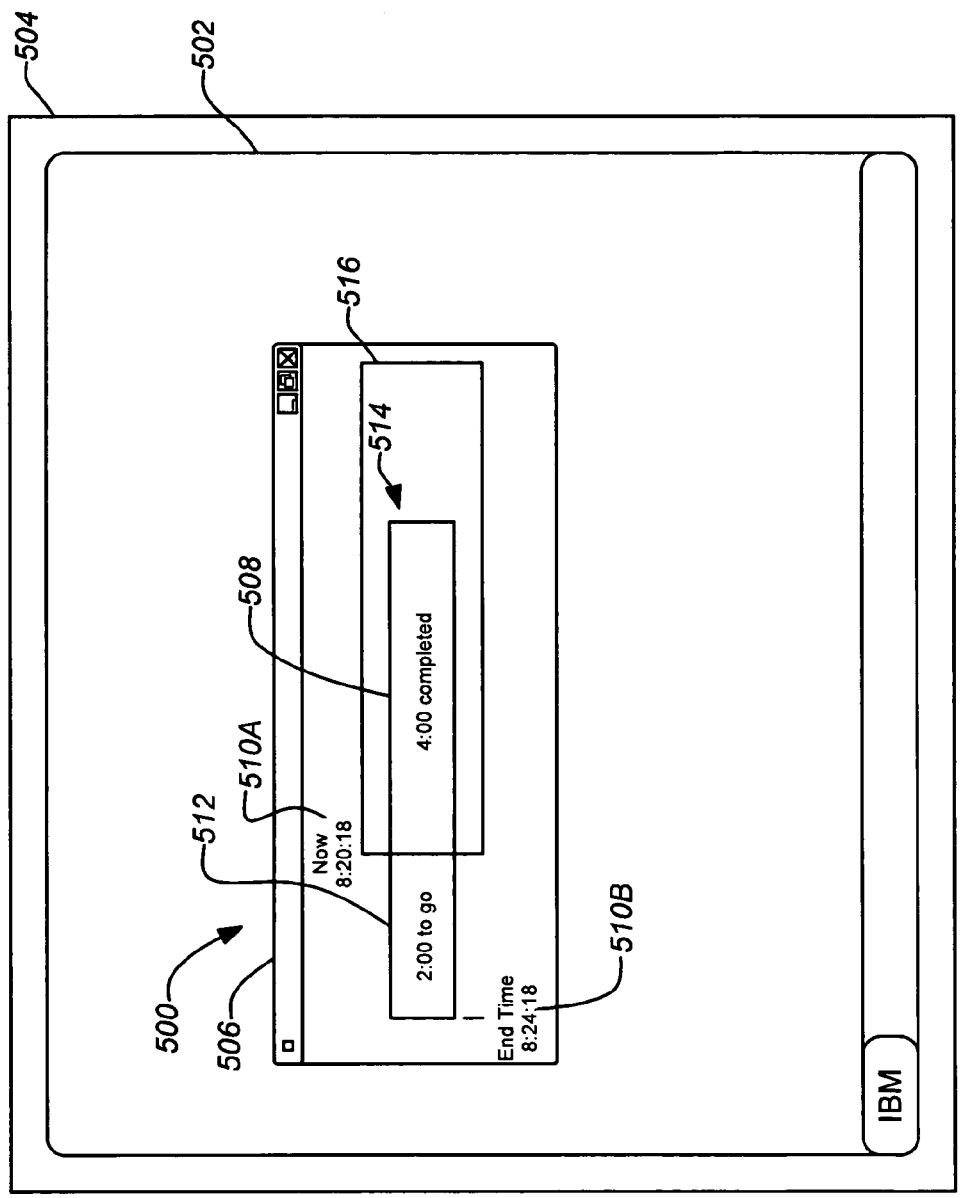
FIG. 5 illustrates another exemplary progress indicator employed in the GUI of a display for a typical computer operating system.

FIG. 5 illustrates another exemplary progress indicator 500 employed in the GUI 502 of a display 504 for a typical computer operating system. As above, the progress indicator 500 may be shown in a window or dialog box 506 of a running software application which is performing an automated computer process. The progress indicator 500 employs a graphical completion indicator shown by the completion bar 508 which is a portion of total bar 514 within the rectangular region 516. The progress indicator 500 also shows a graphical time-based indicator comprising the time scale of the progress indicator 500, shown by the present and end times 510A and 510B in their relative positions. In addition, the estimated remaining time is shown by the bar 512 which is a portion of the total bar 514 outside the rectangular region 516. The total times for completed portion and remaining estimate may also be shown as values within their respective bars 508 and 512. As progress of the automated process is made, the bar 514 continues to move into the rectangle 516. As the running average rate of the processing changes the time scale may be adjusted following the principle described above for the progress indicator 400 applied to the graphical indicator 500.

It will be apparent to those skilled in the art, that the foregoing exemplary progress indicator 500 can be changed by replacing or supplementing the bar 508 with any of the previously described graphical rate indicators, e.g. a bar of varying height, a color indicator or a graph. Similarly, the bar 512 may be replaced or supplemented with any of the remaining time indicators previously described.

4. Method of Indicating Progress of an Automated Computer Process

Figure 6:
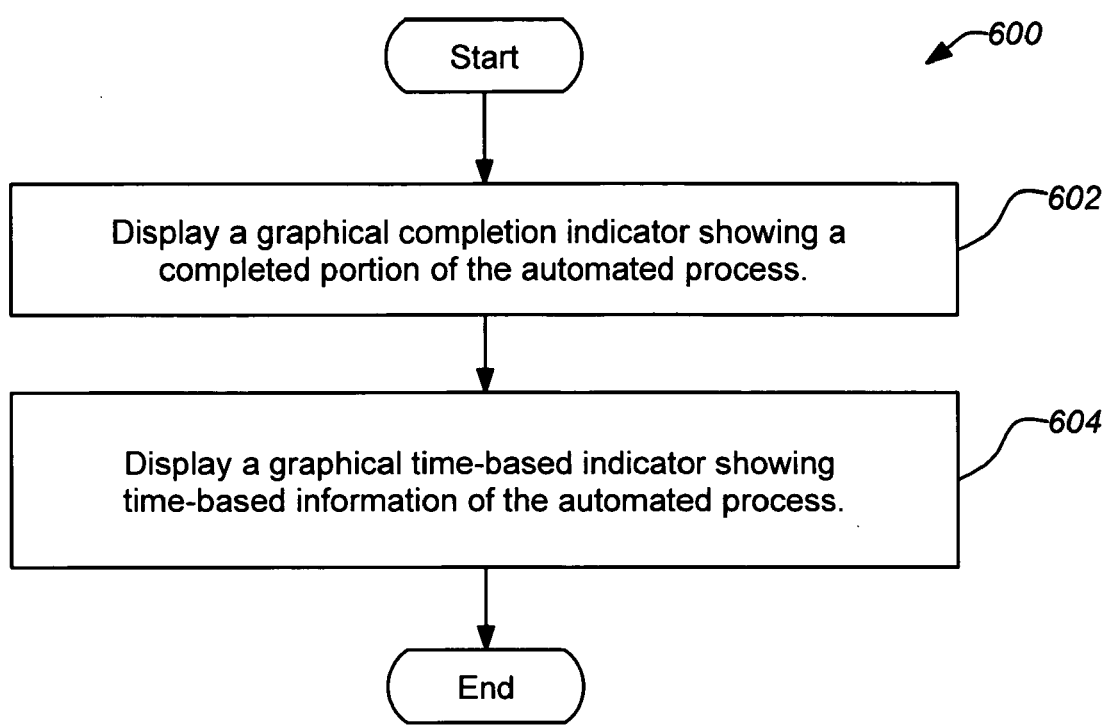
FIG. 6 is a flowchart of an exemplary method of the invention.

FIG. 6 is a flowchart of an exemplary method 600 of the invention. The method 600 includes an operation 602 where a graphical completion indicator is displayed showing a completed portion of the automated process. In another operation 604, a graphical time-based indicator is displayed showing time-based information of the automated process. The method 600 may be further modified consistent with the various progress indicators and computer program embodiments previously described. Particularly, the graphical time-based indicator may comprise, rate and estimated time to completion information and a remaining time indicator can be shown as a time scale for the graphical completion indicator. In addition, instantaneous and historical rate information may be graphically displayed as previously described.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a computer readable medium, comprising:

program instructions for displaying a graphical completion indicator showing a completed portion of the automated process; and program instructions for displaying a graphical time-based indicator showing time-based information of the automated process;

wherein the graphical time-based indicator comprises a graphical remaining time indicator and the graphical remaining time indicator comprises a time scale of the graphical completion indicator and the completed portion of the automated process is shown by the first portion of a first rectangle partially intersecting a second rectangle and the graphical remaining time indicator comprises a second portion of the first rectangle extending outside the second rectangle to show a remaining time estimate, wherein first rectangle moves into the second rectangle such that the second portion gradually decreases as the first portion inside increases as the automated process is completed.

2. A method, comprising:

displaying a graphical completion indicator showing a completed portion of an automated process; and displaying a graphical time-based indicator showing time-based information of the automated process;

wherein the graphical time-based indicator comprises a graphical remaining time indicator and the graphical remaining time indicator comprises a time scale of the graphical completion indicator and the completed portion of the automated process is shown by a first portion of a first rectangle partially intersecting a second rectangle and the graphical remaining time indicator comprises a second portion of the first rectangle extending outside the second rectangle to show a remaining time estimate, wherein first rectangle moves into the second rectangle such that the second portion gradually decreases as the first portion inside increases as the automated process is completed.

* * * * *